(12) United States Patent
Patel et al.

(10) Patent No.: US 10,772,070 B2
(45) Date of Patent: Sep. 8, 2020

(54) MULTI-DIMENSIONAL LOCATION OF AN OBJECT USING MULTIPLE ANTENNAE

(71) Applicant: SIGNIFY HOLDING B.V., Eindhoven (NL)

(72) Inventors: Vrajesh Upendrabhai Patel, Tucker, GA (US); Leonardo Enrique Matute, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/969,618

(22) Filed: May 2, 2018

(65) Prior Publication Data

US 2018/0324744 A1 Nov. 8, 2018

Related U.S. Application Data

(60) Provisional application No. 62/501,483, filed on May 4, 2017.

(51) Int. Cl.
*H04W 64/00* (2009.01)
*G01S 5/04* (2006.01)
(Continued)

(52) U.S. Cl.
CPC ............. *H04W 64/006* (2013.01); *G01S 5/04* (2013.01); *G01S 5/10* (2013.01); *G01S 5/14* (2013.01); *H04W 4/06* (2013.01)

(58) Field of Classification Search
CPC ......... H04W 64/006; H04W 4/06; G01S 5/04; G01S 5/10
(Continued)

(56) References Cited

U.S. PATENT DOCUMENTS 6,784,826 B2 * 8/2004 Kane .................... A61B 5/1038
342/118
10,422,848 B1 9/2019 Li
(Continued)

FOREIGN PATENT DOCUMENTS

EP 2474834 7/2012
WO WO 2007/072285 6/2007
(Continued)

OTHER PUBLICATIONS

International search report for PCT/IB2018/000674, dated Oct. 10, 2018.
(Continued)

*Primary Examiner* — Shahriar Behnamian
(74) *Attorney, Agent, or Firm* — Akarsh P. Belagodu

(57) ABSTRACT

A system for locating an object in a volume of space can include an electrical device having multiple antennae, and a switch coupled to the antennae. The system can also include a controller communicably coupled to the switch. The controller can measure, at a first time, a first parameter of a signal received at a first antenna. The controller can also operate the switch from a first position to a second position, where the first position enables the first antenna, and where the second position enables a second antenna. The controller can further measure, at a second time, a second parameter of the signal received at the second antenna. The controller can also determine, using the first parameter and the second parameter, a multi-dimensional location of the object in the volume of space.

20 Claims, 10 Drawing Sheets

(51) Int. Cl.
  *G01S 5/10* (2006.01)
  *G01S 5/14* (2006.01)
  *H04W 4/06* (2009.01)

(58) Field of Classification Search
  USPC .................................................. 455/456.1
  See application file for complete search history.

(56) References Cited

U.S. PATENT DOCUMENTS

| | | |
|---|---|---|
| 2002/0122006 A1 | 9/2002 | Crawford |
| 2004/0183726 A1 | 9/2004 | Theobold |
| 2005/0143092 A1 | 6/2005 | Tamaki et al. |
| 2005/0156794 A1 | 7/2005 | Theobold |
| 2007/0262872 A1* | 11/2007 | Carrender .......... G06K 7/10346 340/572.7 |
| 2012/0050017 A1* | 3/2012 | Barry .................. G06K 7/0008 340/10.1 |
| 2012/0178471 A1 | 7/2012 | Kainulainen et al. |
| 2012/0218978 A1 | 8/2012 | Ishidoshiro |
| 2012/0302261 A1 | 11/2012 | Tinnakornsrisu |
| 2013/0170374 A1* | 7/2013 | Aljadeff .................. G01S 5/14 370/252 |
| 2013/0260693 A1 | 10/2013 | Un |
| 2013/0342402 A1 | 12/2013 | Pesonen |
| 2014/0327579 A1* | 11/2014 | Hart ................... H04W 64/006 342/374 |
| 2015/0099538 A1* | 4/2015 | Wang ..................... G01S 5/00 455/456.1 |
| 2015/0334676 A1 | 11/2015 | Hart et al. |
| 2016/0088444 A1 | 3/2016 | David et al. |
| 2016/0139237 A1* | 5/2016 | Connolly ................ G01S 5/02 340/10.1 |
| 2016/0286624 A1 | 9/2016 | Patel et al. |
| 2016/0345286 A1* | 11/2016 | Jamieson ............... H04B 17/12 |
| 2018/0052217 A1* | 2/2018 | Jonsson ................... G01S 3/50 |
| 2018/0096179 A1 | 4/2018 | Dang |

FOREIGN PATENT DOCUMENTS

| | | |
|---|---|---|
| WO | WO 2014/131074 | 9/2014 |
| WO | WO 2015/030816 | 3/2015 |

OTHER PUBLICATIONS

International search report for PCT/IB2018/000575, dated Aug. 23, 2018.

International search report for PCT/EP2019/025092, dated Sep. 30, 2019.

\* cited by examiner

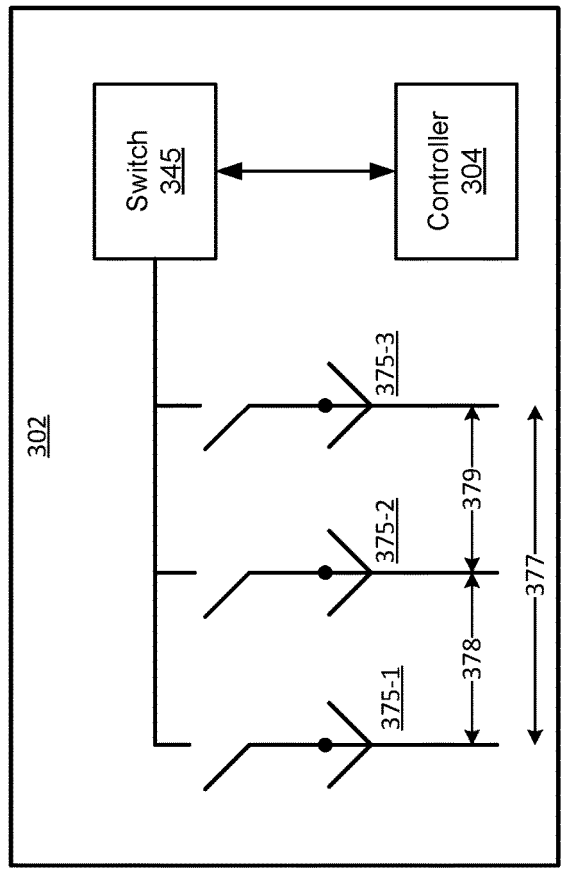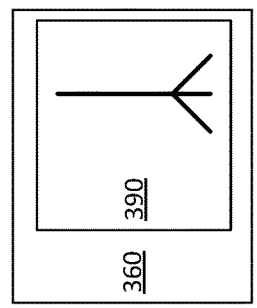
FIG. 3

MULTI-DIMENSIONAL LOCATION OF AN OBJECT USING MULTIPLE ANTENNAE

CROSS-REFERENCE TO RELATED APPLICATIONS

This application claims priority under 35 U.S.C. § 119 to U.S. Provisional Patent Application Ser. No. 62/501,483, titled "Multi-Dimensional Location of an Object Using Multiple Antennae" and filed on May 4, 2017, the entire contents of which are hereby incorporated herein by reference.

TECHNICAL FIELD

Embodiments described herein relate generally to locating objects in a space, and more particularly to systems, methods, and devices for locating objects in a space using multiple antennae.

BACKGROUND

Different methods are used to locate an object within a volume of space. For example, when signals are involved, the Angle of Arrival (AoA) and/or the Angle of Departure (AoD) of each signal can be measured to help determine the location of an object within a volume of space. In such cases, only a single antenna is used. Further, methods currently used in the art rely mostly on strength of signal. As a result, embodiments currently using signals in the art to locate an object in only a single dimension, and so are not very accurate.

SUMMARY

In general, in one aspect, the disclosure relates to a system for locating an object in a volume of space. The system can include an electrical device having multiple antennae. The system can also include a switch coupled to the antennae. The system can further include a controller communicably coupled to the switch. The controller can measure, at a first time, a first parameter of a signal received at a first antenna, where the first parameter of the signal is associated with a location of the object. The controller can also operate the switch from a first position to a second position, where the first position enables the first antenna, and wherein the second position enables a second antenna. The controller can further measure, at a second time, a second parameter of the signal received at the second antenna, where the second parameter of the signal is associated with the location of the object. The controller can also determine, using the first parameter and the second parameter, a multi-dimensional location of the object in the volume of space.

In another aspect, the disclosure can generally relate to a system that includes an electrical device having an electrical device antenna and a controller, where the electrical device is located in a volume of space. The system can also include an object located in the volume of space, where the object includes multiple object antennae and a switch coupled to the object antennae. The object can operate the switch to activate a first object antenna. The object can also broadcast a first signal at a first time through the first object antenna. The object can further operate the switch to activate a second object antenna. The object can also broadcast a second signal at a second time through the second object antenna. The electrical device antenna can receive the first signal having a first parameter and the second signal having a second parameter. The controller can determine, using the first parameter of the first signal and the second parameter of the second signal, a multi-dimensional location of the object in the volume of space.

In another aspect, the disclosure can generally relate to an electrical device that includes a housing and a first antenna of multiple antennae disposed on the housing at a first location. The electrical device can also include a second antenna disposed on the housing at a second location. The electrical device can further include a switch coupled to the multiple antennae. The electrical device can also include a controller communicably coupled to the switch. The controller can measure, at a first time, a first parameter of a signal received at the first antenna, where the first parameter of the signal is associated with a location of the object. The controller can also operate the switch from a first position to a second position, where the first position enables the first antenna, and where the second position enables a second antenna. The controller can further measure, at a second time, a second parameter of the signal received at the second antenna, where the second parameter of the signal is associated with the location of the object. The controller can also determine, using the first parameter and the second parameter, a multi-dimensional location of the object in a volume of space.

These and other aspects, objects, features, and embodiments will be apparent from the following description and the appended claims.

BRIEF DESCRIPTION OF THE DRAWINGS

The drawings illustrate only example embodiments of multi-dimensional location of an object using multiple antennae and are therefore not to be considered limiting of its scope, as multi-dimensional location of an object using multiple antennae may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 3 shows a system in which an object is located in volume of space in accordance with certain example embodiments.

DETAILED DESCRIPTION OF EXAMPLE EMBODIMENTS

Figure 1:
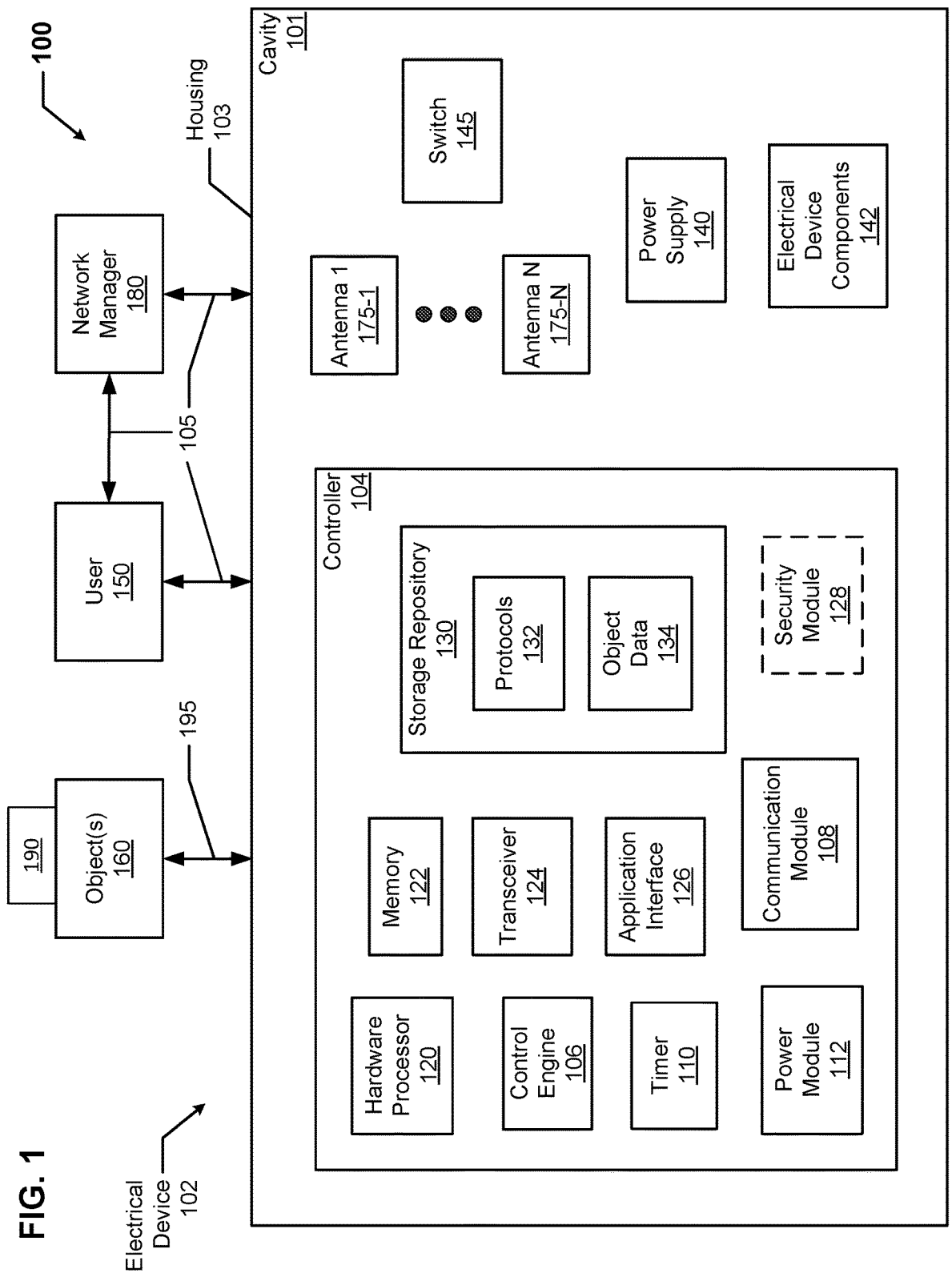
FIG. 1 shows a diagram of a system that includes a light fixture in accordance with certain example embodiments.

The example embodiments discussed herein are directed to systems, methods, and devices for multi-dimensional location of an object using multiple antennae. While example embodiments are described herein as using multiple antennae disposed on a light fixture to locate an object in a volume of space, example embodiments can use one or more of a number of other electrical devices in addition to, or as an alternative to, light fixtures. Such other electrical devices can include, but are not limited to, a light switch, a control panel, a wall outlet, a smoke detector, a $CO_2$ monitor, a motion detector, a broken glass sensor, and a camera.

Further, while example embodiments use the triangulation methods of AoA or AoD, both of which are described in more detail below with respect to FIGS. 3-10, to determine the location of an object in a volume of space, other location methods, including but not limited to trilateration, can be used with example embodiments. With trilateration, rather than measuring the angle of the signals, the distance and/or time that each signal travels between an object and an antenna is measured, and those distances and/or times are used to determine the location of the object.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals, example embodiments can be used with any of a number of other types of signals, including but not limited to WiFi, Bluetooth, RFID, ultraviolet waves, microwaves, and infrared signals. Example embodiments can be used to locate, in multiple dimensions, an object in a volume of space in real time.

Example embodiments of light fixtures described herein can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

A user may be any person that interacts with a light fixture and/or object in a volume of space. Specifically, a user may program, operate, and/or interface with one or more components (e.g., a controller, a network manager) associated with a system using example embodiments. Examples of a user may include, but are not limited to, an engineer, an electrician, an instrumentation and controls technician, a mechanic, an operator, a consultant, a contractor, an asset, a network manager, and a manufacturer's representative.

As defined herein, an object can be any unit or group of units. An object can move on its own, is capable of being moved, or is stationary. Examples of an object can include, but are not limited to, a person (e.g., a user, a visitor, an employee), a part (e.g., a motor stator, a cover), a piece of equipment (e.g., a fan, a container, a table, a chair), or a group of parts of equipment (e.g., a pallet stacked with inventory).

Example embodiments provide a highly accurate two- or three-dimensional location of an object in a volume of space. Further, example embodiments can provide high locational accuracy (as compared, for example, to using RSSI ((Receive Signal Strength Indicator)). In addition, example embodiments, provide a high level of data security if such security is desired by a user. Example embodiments are also more reliable, using low amounts of power on demand.

In certain example embodiments, light fixtures comprising antennae used for multi-dimensional location of an object are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of multi-dimensional location of an object using multiple antennae will be described more fully hereinafter with reference to the accompanying drawings, in which example embodiments of multi-dimensional location of an object using multiple antennae are shown. Multi-dimensional location of an object using multiple antennae may, however, be embodied in many different forms and should not be construed as limited to the example embodiments set forth herein. Rather, these example embodiments are provided so that this disclosure will be thorough and complete, and will fully convey the scope of multi-dimensional location of an object using multiple antennae to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of multi-dimensional location of an object using multiple antennae. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 in accordance with certain example embodiments. The system 100 can include one or more objects 160, a user 150, a network manager 180, an electrical device 102. The electrical device 102 can include a controller 104, multiple antennae 175, a switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in the example system 100. For instance, any component of the example electrical device 102 can be discrete or combined with one or more other components of the electrical device 102. For example, rather than one switch 145, there can be multiple switches 145. As another example, instead of a single electrical device 102 with multiple antennae 175, the system 100 can have multiple electrical devices 102, each with one antenna 175, that are communicably coupled to each other. As yet another example, the switch 145 can be part of the controller 104.

The user 150 is the same as a user defined above. The user 150 can use a user system (not shown), which may include a display (e.g., a GUI). The user 150 interacts with (e.g., sends data to, receives data from) the controller 104 of an electrical device 102 via the application interface 126 (described below). The user 150 can also interact with a network manager 180 and/or one or more of the objects 160. Interaction between the user 150, the electrical device 102, and the network manager 180 is conducted using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of a electrical device 102 and to the network manager 180. The communication link 105 can transmit signals (e.g., power signals, communication signals, control signals, data) between the electrical device 102, the user 150, and the network manager 180. By contrast, the electrical device 102 of the system 100 can interact with the one or more objects 160 using location signals 195, as discussed below. The one or more objects 160 can communicate with the user 150 and/or the network manager 180 using the communication links 105.

The network manager 180 is a device or component that controls all or a portion of the system 100 that includes the controller 104 of the electrical device 102. The network manager 180 can be substantially similar to the controller 104. Alternatively, the network manager 180 can include one or more of a number of features in addition to, or altered from, the features of the controller 104 described below.

The one or more objects 160 can be any of a number of people and/or devices, as described above. Each object 160 can include a communication device 190, which can send RF signals 195 to the electrical device 102. The communication device 190 can include one or more components (e.g., switch, antenna, transceiver) of an electrical device 102 and/or functionality described below with respect to a controller 104 of an electrical device 102.

Using example embodiments, the communication device 190 (also sometimes called a beacon) of the object 160 can be in sleep mode until the communication device 190 receives a RF signal 195 broadcast by one or more antennae 175 of the electrical device 102. When this occurs, the communication device 190 can turn on long enough to interpret the initial RF signal 195, and then generate and send its own RF signal 195 to the electrical device 102 in response to the initial RF signal 195. Alternatively, the communication device 190 of the object 160 can be in sleep mode until some pre-determined point in time (e.g., every hour, every 24 hours) that is independent of the antennae 175 of the electrical device 102. When this occurs, the communication device 190 can turn on long enough to send a RF signal 195 to the electrical device 102 so that all of the antennae 175 of the electrical device 102 receive the RF signal 195. This latter embodiment can be used with AoA methods of locating the object 160. In any case, the RF signal 195 can include a UUID (or some other form of identification) associated with the object 160. Once the RF signal 195 is sent by the communication device 190, the communication device 190 can go back into sleep mode, thereby reserving a considerable amount of power.

The communication device 190 can use one or more of a number of communication protocols in sending the RF signals 195 with the antennae 175 of the electrical device 102. In certain example embodiments, an object 160 can include a battery (a form of power supply or power module) that is used to provide power, at least in part, to some or all of the rest of the object 160, including the communication device 190.

In certain example embodiments, when an object 160 is located using AoD methods, the communication device 190 includes multiple antennae and a corresponding switch, where the antenna is substantially the same as the antenna 175 described above, and the switch is substantially the same as the switch 145 descried above. In such a case, the electrical device 102 can have one antenna 175 with no switch 145 or multiple antennae 175 with a corresponding switch 145. An example of locating an object 160 using AoD in certain example embodiments is shown below with respect to FIGS. 7-10.

The user 150, the network manager 180, and/or any other applicable electrical devices 102 can interact with the controller 104 of the electrical device 102 using the application interface 126 in accordance with one or more example embodiments. Specifically, the application interface 126 of the controller 104 receives data (e.g., information, communications, instructions) from and sends data (e.g., information, communications, instructions) to the user 150 and the network manager 180. The user 150 and the network manager 180 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102 can include a housing 103. The housing 103 can include at least one wall that forms a cavity 101. In some cases, the housing 103 can be designed to comply with any applicable standards so that the electrical device 102 can be located in a particular environment (e.g., a hazardous environment). For example, if the electrical device 102 is located in an explosive environment, the housing 103 can be explosion-proof. According to applicable industry standards, an explosion-proof enclosure is an enclosure that is configured to contain an explosion that originates inside, or can propagate through, the enclosure.

The housing 103 of the electrical device 102 can be used to house one or more components of the electrical device 102, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the antennae 175, the switch 145, and the electrical device components 142 are disposed in the cavity 101 formed by the housing 103. In alternative embodiments, any one or more of these or other components of the electrical device 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more of the objects 160, and any other applicable electrical devices 102 within the system 100. In one or more example embodiments, the storage repository 130 stores one or more protocols 132 and object data 134. The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150, the network manager 180, any other applicable electrical devices 102, and one or more of the objects 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

Object data 134 can be any data associated with each object 160 that is communicably coupled to the controller 104. Such data can include, but is not limited to, a manufacturer of the object 160, a model number of the object 160, communication capability of an object 160, last known location of the object 160, and age of the object 160. Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132 and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, any other applicable electrical devices 102, and the objects 160 in the system 100. More specifically, the control engine 106 sends information to and/or receives information from the storage repository 130 in order to communicate with the user 150, the network manager 180, any other applicable electrical devices 102, and the objects 160. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the transceiver 124) of the controller 104. For example, the control engine 106 can put the communication module 108 in "sleep" mode when there are no communications between the controller 104 and another component (e.g., an object 160, the user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to receive, through the switch 145 and one or more of the antennae 175, RF signals 195 from one or more objects 160 in the system 100. This example provides another instance where the control engine 106 can conserve power used by the controller 104 and other components (e.g., the objects 160) of the system 100.

The control engine 106 can determine when to receive one or more RF signals 195 in an attempt to locate an object 160. To conserve energy, the control engine 106 does not constantly receive RF signals 195, but rather only does so at discrete times. The control engine 106 can be active to receive a RF signal 195 based on one or more of a number of factors, including but not limited to passage of time, the occurrence of an event, instructions from a user 150, and a command received from the network manager 180.

In some cases, when the system 100 includes multiple electrical devices 102, each electrical device 102 can have some form of a controller 104. The control engine 106 of one controller 104 can coordinate with the controllers 104 of the other electrical devices 102 and/or directly control one or more of the other electrical devices 102 to broadcast multiple RF signals 195 and/or receive multiple RF signals 195. In this example, the control engine 106 can operate one or more switches 145 to accomplish its function.

In some cases, the control engine 106 of the electrical device 102 can locate the object 160 based on the multiple RF signals 195 sent by (e.g., originated from, reflected off of) the object 160 in response to the multiple RF signals 195 broadcast by the electrical device 102. To accomplish this, the control engine 106 obtains the multiple RF signals 195 (directly from the antennae 175 through the switch 145 and/or from another control engine 106 from one or more of the other electrical devices 102) broadcast by the object 160 and/or reflected from the object 160. The control engine 106 can also uses one or more protocols 132 and/or algorithms (part of data stored in the storage repository 130) to determine the multi-dimensional location of the object 160 based on the RF signals 195.

For example, the protocols 132 and/or algorithms used by the control engine 106 can require the control engine 106 to use triangulation methods to determine the location of an object 160 using, for example, the angle of arrival (AoA) and/or the angle of departure (AoD) of each RF signal 195 received from the object 160. The protocols 132 and/or algorithms used by the control engine 106 to dictate when and how the control engine 106 operates the switch 145. As a result, the protocols 132 and/or algorithms used by the control engine 106 can also assist the control engine 106 to determine the multi-dimensional location of one or more objects 160. If two antennae 175 are used, then a two-dimensional location of an object 160 can be obtained by the control engine 106. An example of how an object can be located using AoA is provided below with respect to FIGS. 3-6, and another example of how an object can be located using AoD is provided below with respect to FIGS. 7-10. An example of an algorithm used by the control engine 106 can include, but is not limited to, angle=wavelength×difference in distance in space between antennae÷2÷π÷distance between antennae.

In some cases (e.g., the antennae 175 are located far enough apart relative to each other on the housing 103 of the electrical device 102 (or other electrical device)), the protocols 132 and/or algorithms used by the control engine 106 can require the control engine 106 to use trilateration methods to determine the location of the object 160. For example, a troffer light with antennae positioned along the length of the frame of the troffer light may be a situation where trilateration techniques can be used with the example embodiments described herein. With trilateration techniques, rather than measuring angles (a type of parameter measured at the antennae 175) at which the RF signals 195 are received by the antennae 175 for triangulation, the distance and/or time (another types of parameters measured at the antennae 175) that each RF signal 195 received by each of the antennae 175 is measured. In order for trilateration to be effective to accurately locate the object 160 in a three-dimensional space, at least three antennae 175 are needed.

The control engine 106 can provide control, communication, RF signals 195, and/or other signals to the user 150, the network manager 180, and one or more of the objects 160. Similarly, the control engine 106 can receive control, communication, RF signals 195, and/or other signals from the user 150, the network manager 180, and one or more of the objects 160. The control engine 106 can communicate with each object 160 automatically (for example, based on one or more algorithms stored in the storage repository 130) and/or based on control, communication, and/or other similar signals received from another device (e.g., the network manager 180) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102. For example, if the power supply 140 of the electrical device 102 operates under IEC Standard 62386, then the power supply 140 can include a digital addressable lighting interface (DALI). In such a case, the control engine 106 can also include a DALI to enable communication with the power supply 140 within the electrical device 102. Such an interface can operate in conjunction with, or independently of, the communication protocols 132 used to communicate between the controller 104 and the user 150, the network manager 180, any other applicable electrical devices 102, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I²C), and a pulse width modulator (PWM).

Using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and receiving RF signals 195 from an object 160, operating a switch 145) of one or more other applicable electrical devices in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150, the network manager 180, and any other applicable electrical devices 102 can be secure.

The communication module 108 of the controller 104 determines and implements the communication protocol (e.g., from the protocols 132 of the storage repository 130) that is used when the control engine 106 communicates with (e.g., sends signals to, receives signals from) the user 150, the network manager 180, any other applicable electrical devices 102, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150, and the network manager 180, and/or any other applicable electrical devices 102. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals, including RF signals 195. Specifically, the transceiver 124 can be used to transfer data between the controller 104 and the user 150, the network manager 180, any other applicable electrical devices 102, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, any other applicable electrical devices 102, and/or the objects 160.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150, the network manager 180, any other applicable electrical devices 102, and/or the objects 160 can be part of the object data 134 (or similar areas) of the storage repository 130.

Optionally, in one or more example embodiments, the security module 128 secures interactions between the controller 104, the user 150, the network manager 180, any other applicable electrical devices 102, and/or the objects 160. More specifically, the security module 128 authenticates communication from software based on security keys verifying the identity of the source of the communication. For example, user software may be associated with a security key enabling the software of the user 150 to interact with the controller 104 of the electrical device 102. Further, the security module 128 can restrict receipt of information, requests for information, and/or access to information in some example embodiments.

As mentioned above, aside from the controller 104 and its components, the electrical device 102 can include a power supply 140, multiple antennae 175, at least one switch 145, and one or more electrical device components 142. The electrical device components 142 of the electrical device 102 are devices and/or components typically found in an electrical device to allow the electrical device 102 to operate. An electrical device component 142 can be electrical, electronic, mechanical, or any combination thereof. The electrical device 102 can have one or more of any number and/or type of electrical device components 142. Examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102 provides power to one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102. In addition, or in the alternative, the power supply 140 can be a source of power in itself. For example, the power supply 140 can be a battery, a localized photovoltaic power system, or some other source of independent power.

As discussed above, the electrical device 102 includes multiple antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the switch 145, an electric current oscillating at radio frequency (i.e. a high frequency alternating current (AC)) to the terminals of the antenna 175, and the antenna 175 radiates the energy from the current as RF signals 195. In reception, an antenna 175 intercepts some of the power of RF signals 195 in order to produce a tiny voltage at its terminals, that is applied through the switch 145 to a receiver (e.g., transceiver 124) to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 exert force on the electrons in the body of the antenna 175, causing portions of the body of the antenna 175 to move back and forth, creating oscillating currents in the antenna 175.

In certain example embodiments, an antenna 175 (e.g., antenna 175-1, antenna 175-N) can be disposed at, within, or on any portion of the electrical device 102. For example, an antenna 175 can be disposed on the housing 103 of the electrical device 102 and extend away from the electrical device 102. As another example, an antenna 175 can be insert molded into a lens of the electrical device 102. As another example, an antenna 175 can be two-shot injection molded into the housing 103 of the electrical device 102. As yet another example, an antenna 175 can be adhesive mounted onto the housing 103 of the electrical device 102. As still another example, an antenna 175 can be pad printed onto a circuit board within the cavity 101 formed by the housing 103 of the electrical device 102. As yet another example, an antenna 175 can be a chip ceramic antenna that is surface mounted. As still another example, an antenna 175 can be a wire antenna.

Each antenna 175 can be electrically coupled to the switch 145, which in turn is electrically coupled to the transceiver 124. The switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state and a closed state (position). In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
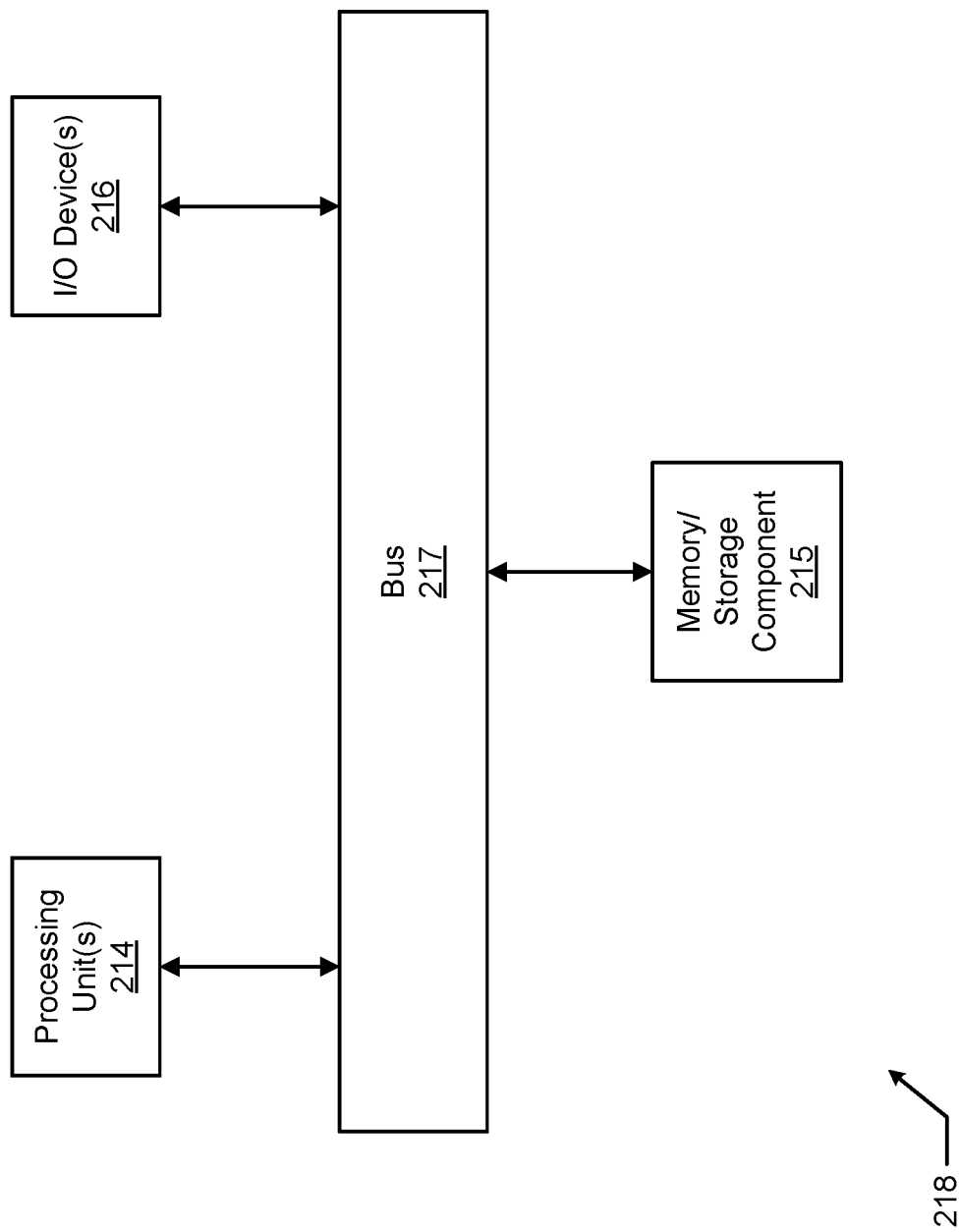
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

FIG. 3 shows a system 300 that can use an AoA method to locate an object 360 in a volume of space 399 in accordance with certain example embodiments. Referring to FIGS. 1-3, also located in the volume of space 399 of FIG. 3 is a light fixture 302 (a type of electrical device, as with the electrical device 102 of FIG. 1 above) having three antennae 375 (antenna 375-1, antenna 375-2, and antenna 375-3). As discussed above, the volume of space 399 can be of any size and/or in any location. For example, the volume of space 399 can be a room in an office building.

As shown in FIG. 3, all three of the antenna 375 of the light fixture 302 can be located in the volume of space 399. Alternatively, one or more of the antenna can be located on another device (e.g., another light fixture). In any case, it is possible that one or more of the antennae 375 can be located outside the volume of space 399, as long as the RF signals (e.g., RF signals 195) sent by the communication device 390 of the object 360 are received by the antenna 375 of the light fixture 302.

In certain example embodiments, an antenna 375 is separated by one or more adjacent antenna 375 by some distance. For example, as shown in FIG. 3, antenna 375-1 is separated from antenna 375-2 by distance 378, antenna 375-3 is separated from antenna 375-2 by distance 379, and antenna 375-1 is separated from antenna 375-3 by distance 377. Each of the distances (distance 377, distance 378, and distance 379 in this example) can be based on one or more of a number of factors. For example, each distance can be at least ½ the wavelength of the RF signals (e.g., RF signals 195). In such a case, one antenna 375 can send/receive a RF signal that is at least 90° out of phase with a RF signal sent/received by another antenna 375. This makes the RF signals (and the parameters (e.g., angles, distances, times) associated with them) measured at each antenna 375 easier to interpret. As a specific example, if the wavelength of the RF signals 195 is 2.4 GHz, then each distance (distance 377, distance 378, distance 379) is at least approximately ½ inch. One distance (e.g., distance 377, distance 378, distance 379) can be the same as and/or different than the other distances.

The light fixture 302 of FIG. 3 also includes a switch 345 that is coupled to the three antennae 375. The light fixture 302 can also include, although not shown in FIG. 3, a control engine (e.g., control engine 106) for automatically operating the switch 345 and a transceiver (e.g., transceiver 124) for sending and/or receiving the RF signals. Further, the object 360 of FIG. 3 includes a communication device 390, which can be substantially the same as the communication device 190 discussed above with respect to FIG. 1. For example, as shown in FIG. 3, the communication device 390 of FIG. 3 can include an antenna. In some cases, the communication device 390 can also include a controller, which can perform at least some of the capabilities of the controller 104 described above.

Figure 4:
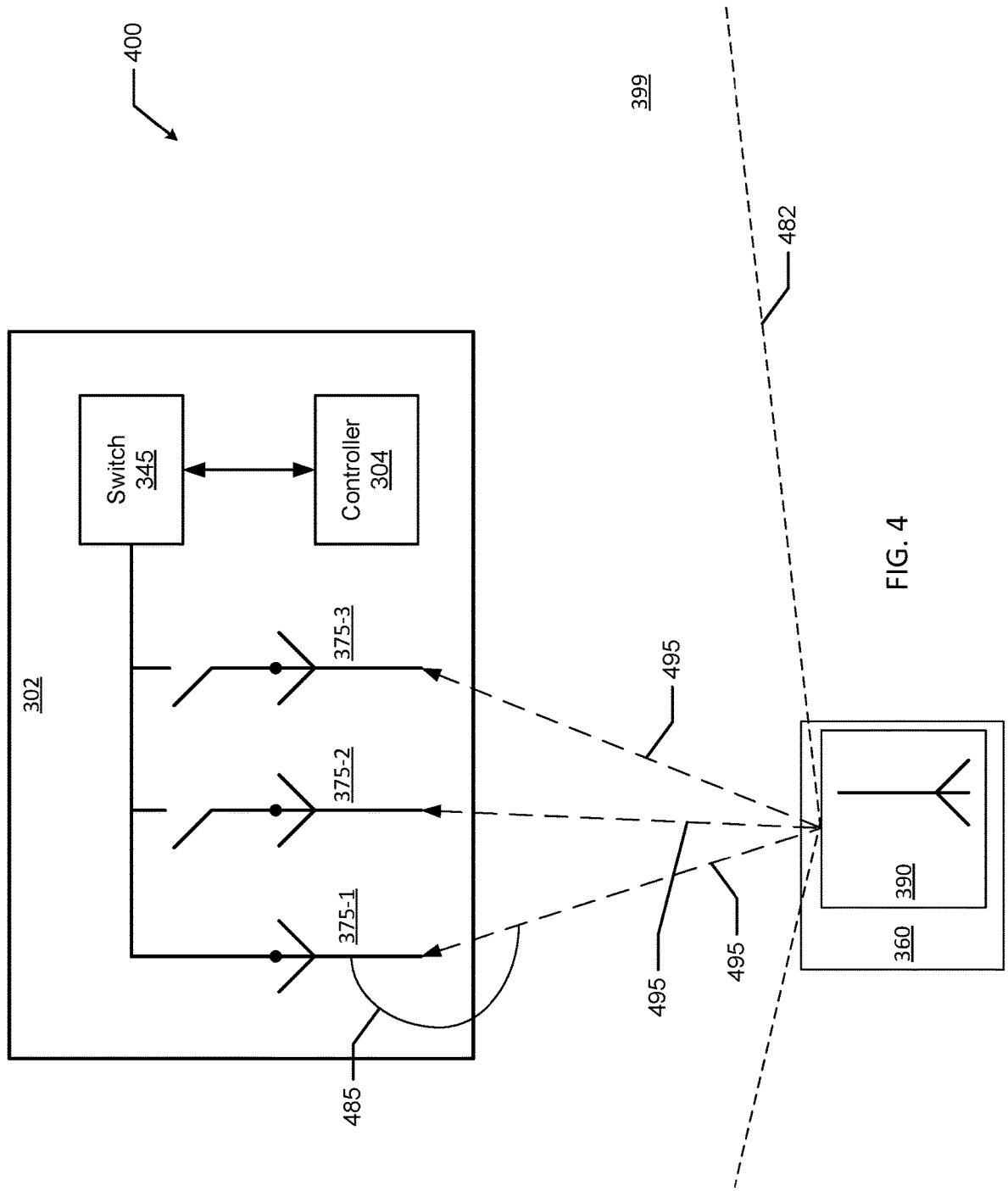
FIGS. 4-6 show the system of FIG. 3 where the object is located in a volume of space using an AoA method in accordance with certain example embodiments.
Figure 5:
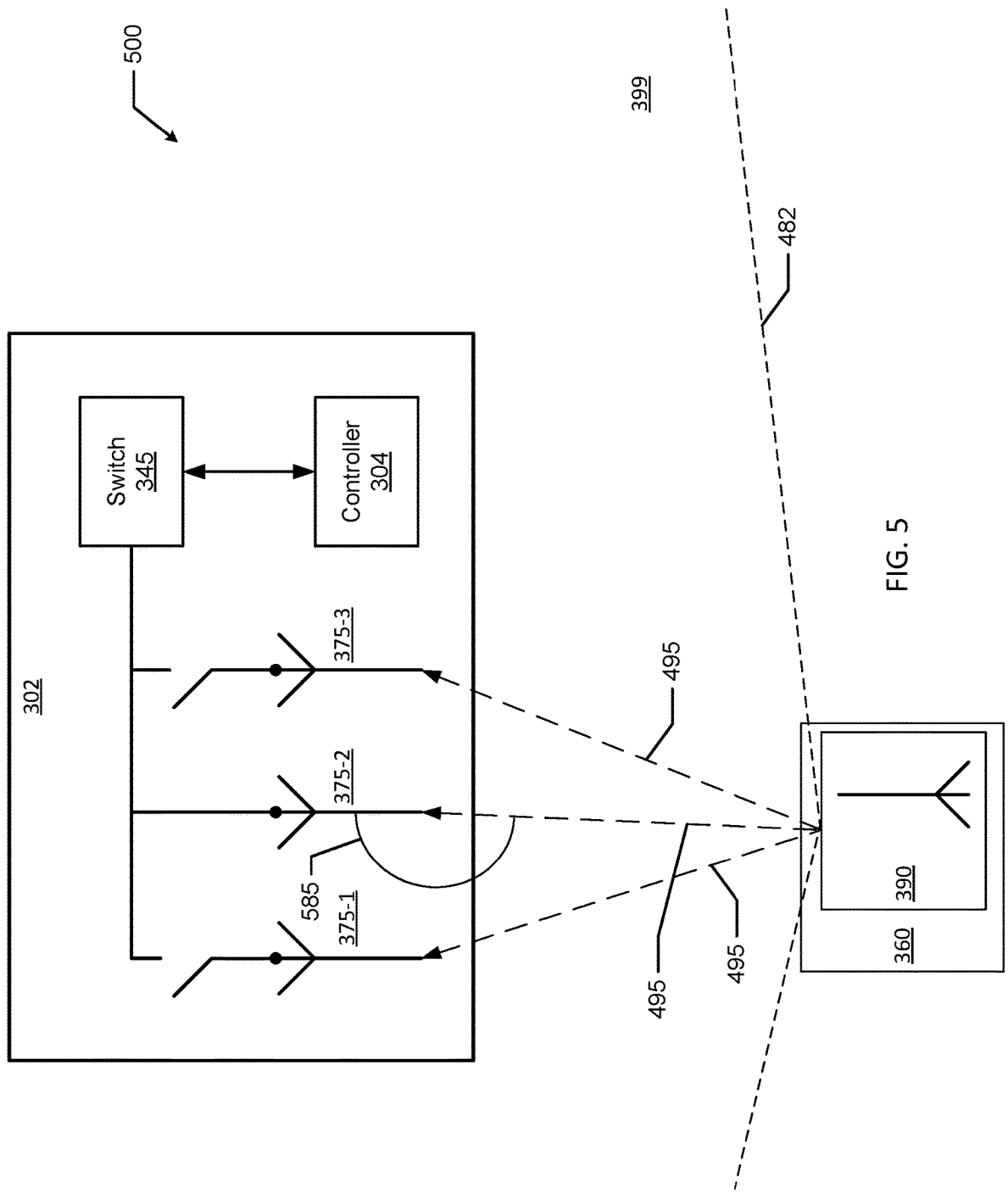
Figure 6:
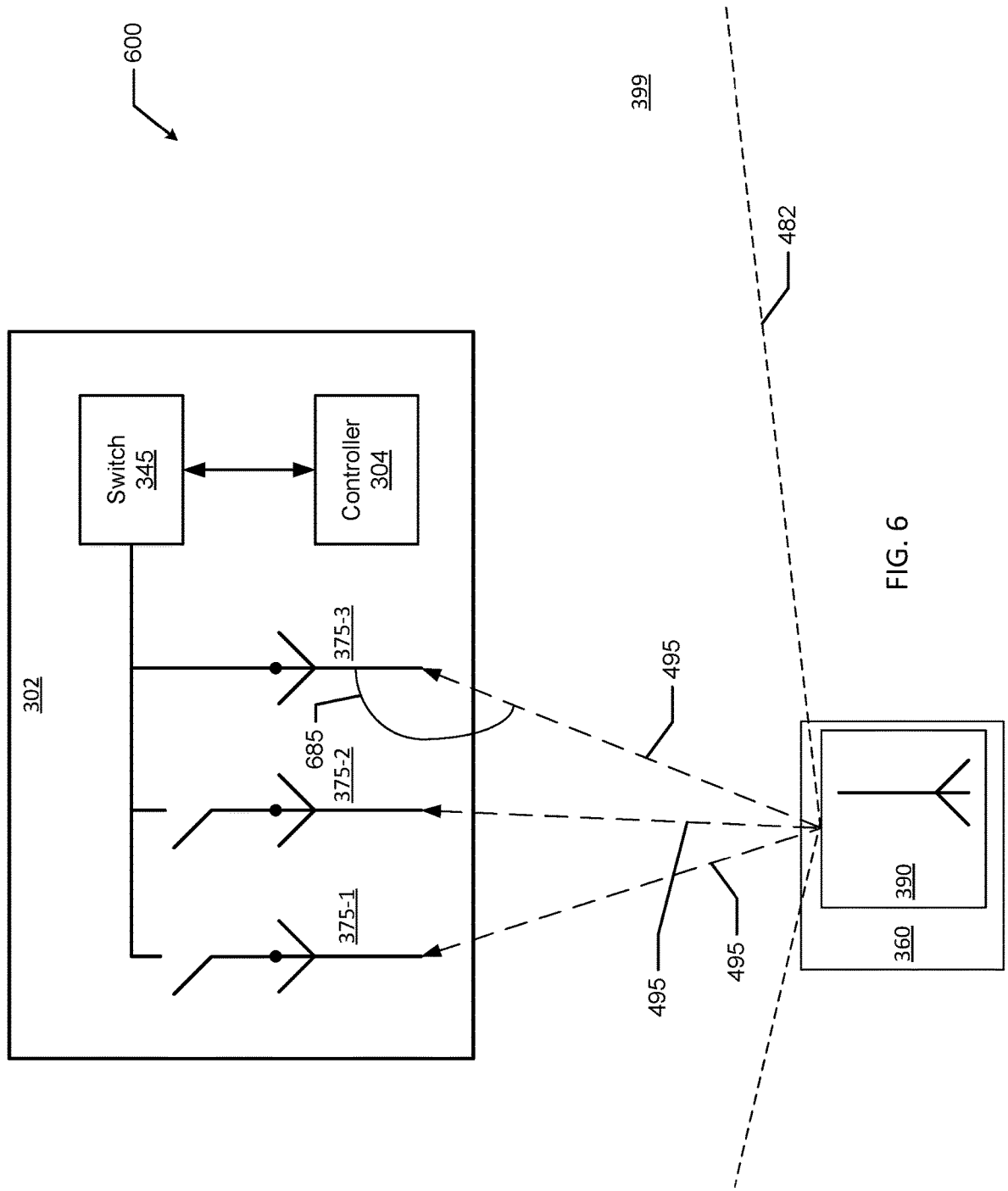

FIGS. 4-6 show the system of FIG. 3 when RF signals are sent by the object 360 and the location of the object 360 is determined using an AoA method in accordance with certain example embodiments. FIG. 4 shows the system 400 of FIG. 3 where the communication device 390 of the object 360 begins to broadcast a RF signal 495 in accordance with certain example embodiments. Referring to FIGS. 1-6, antenna 375-1, antenna 375-2, and antenna 375-3 of the light fixture 302 receive RF signal 495. The communication device 390 of the object 360 has a broadcast range 482, and all of the antennae 375 of the light fixture 302 fall within the broadcast range 482.

In FIG. 4, the switch 345 in this case is closed for antenna 375-1 and open for antenna 375-2 and antenna 375-3. As a result, only the RF signal 495 received by antenna 375-1 at the point in time captured by FIG. 4 is sent through the switch 345 to the controller 304. When the controller 304 receives the RF signal 495 through antenna 375-1, the controller 304 can use one or more algorithms and/or protocols 132 to determine the angle 485 (a type of parameter) at which the RF signal 495 arrives (AoA) at antenna 375-1.

At some other subsequent point in time (e.g., 2 ms later, 50 ms later) relative to the time captured in FIG. 4, the controller 304 of the light fixture 302 operates, resulting in the configuration of the system 500 shown in FIG. 5. In FIG. 5, the switch 345 in this case is closed for antenna 375-2 and open for antenna 375-1 and antenna 375-3. As a result, only the RF signal 495 received by antenna 375-2 at the point in time captured by FIG. 5 is sent through the switch 345 to the controller 304. When the controller 304 receives the RF signal 495 through antenna 375-2, the controller 304 can use one or more algorithms and/or protocols 132 to determine the angle 585 (a type of parameter) at which the RF signal 495 arrives (AoA) at antenna 375-2.

At some other subsequent point in time (e.g., 3 ms later) relative to the time captured in FIG. 5, the controller 304 of the light fixture 302 operates, resulting in the configuration of the system 600 shown in FIG. 6. In FIG. 6, the switch 345 in this case is closed for antenna 375-3 and open for antenna 375-2 and antenna 375-1. As a result, only the RF signal 495 received by antenna 375-3 at the point in time captured by FIG. 6 is sent through the switch 345 to the controller 304. When the controller 304 receives the RF signal 495 through antenna 375-3, the controller 304 can use one or more algorithms and/or protocols 132 to determine the angle 685 (a type of parameter) at which the RF signal 495 arrives (AoA) at antenna 375-3.

Once the controller 304 has determined the angle 485 and the angle 585, the controller 304 can determine the location of the object 360 in two dimensions within the volume of space 399 using the AoA method according to example embodiments. Once the controller 304 has determined the angle 485, the angle 585, and the angle 685 (or even additional angles if the light fixture 302 has more than three antennae 375), the controller 304 can determine the location of the object 360 in three dimensions within the volume of space 399 using the AoA method according to example embodiments.

Figure 7:
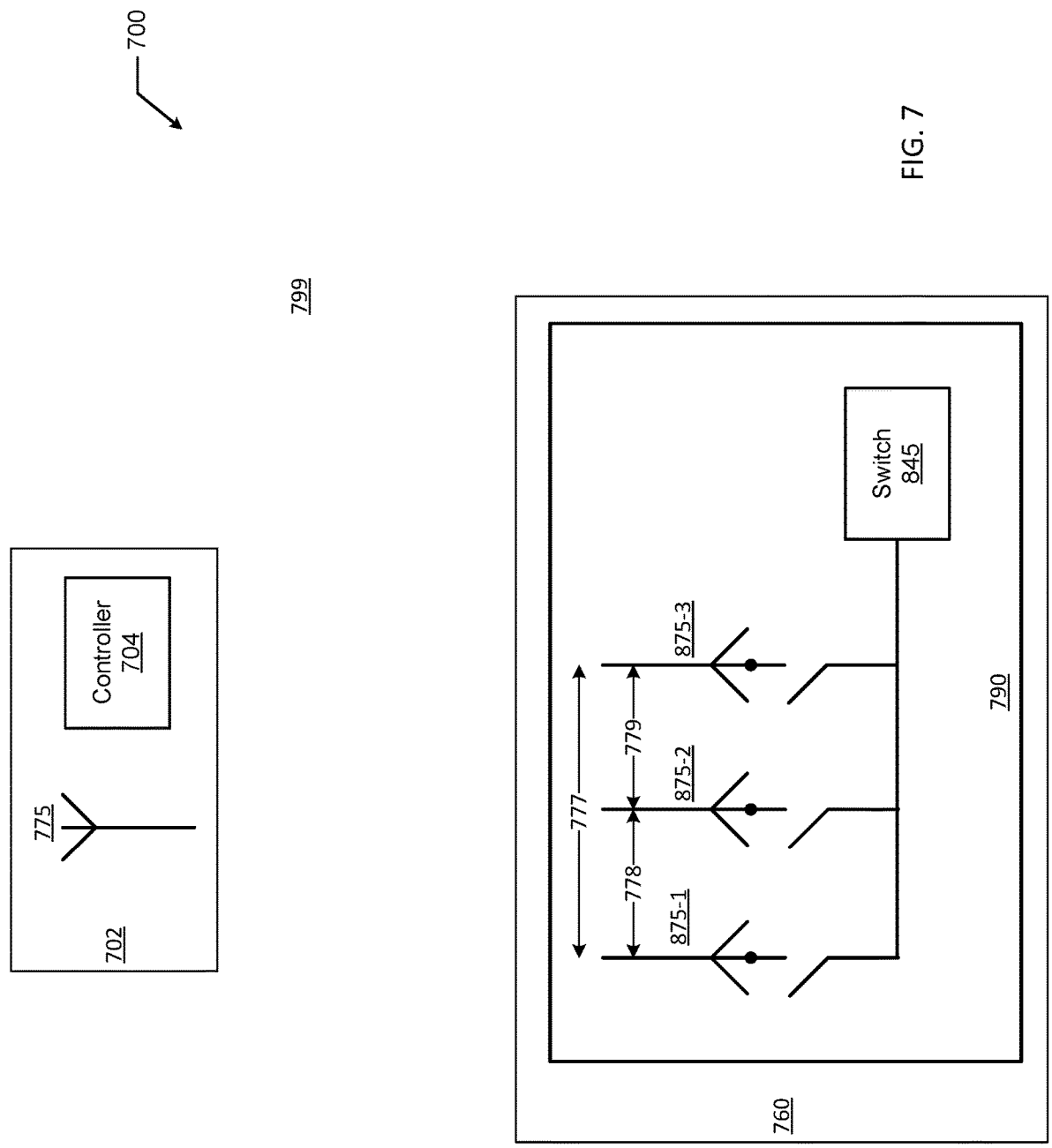
FIG. 7 shows another system where an object is located in volume of space in accordance with certain example embodiments.

FIG. 7 shows a system 700 that can use a AoD method for determining the location of an object 760 in a volume of space 799 in certain example embodiments. Referring to FIGS. 1-7, the light fixture 702, having a controller 704 and only a single antenna 775, is located in a volume of space 799 in FIG. 7. Alternatively, the light fixture 702 can have multiple antennae 775, in which case, the light fixture 702 can also include a switch 745. In addition, the object 760 includes a communication device 790, where the communication device 790 has a switch 845 and multiple (in this case three) antennae 875. Specifically, the communication device 790 includes antenna 875-1, antenna 875-2, and antenna 875-3. The object 760, including the communication device 790, is also located in the volume of space 799. As stated above with the previous example using the AoA method, it is possible that one or more of the antennae (e.g., antennae 875, antenna 775) can be located outside the volume of space 799, as long as the RF signals (e.g., RF signals 195) sent by the communication device 790 of the object 760 are received by the antenna 775 of the light fixture 702.

In certain example embodiments, an antenna 875 of the communication device 790 of the object 760 is separated by one or more adjacent antenna 875 by some distance. For example, as shown in FIG. 7, antenna 875-1 is separated from antenna 875-2 by distance 778, antenna 875-3 is separated from antenna 875-2 by distance 779, and antenna 875-1 is separated from antenna 875-3 by distance 777. Each of the distances (distance 777, distance 778, and distance 779 in this example) can be based on one or more of a number of factors. For example, each distance can be at least ½ the wavelength of the RF signals (e.g., RF signals 195). In such a case, one antenna 775 can send a RF signal that is at least 90° out of phase with a RF signal sent by another antenna 775. This makes the RF signals (and the parameters (e.g., angles, distances, times) associated with them) easier to interpret. As a specific example, if the wavelength of the RF signals 195 is 2.4 GHz, then each distance (distance 777, distance 778, distance 779) is at least approximately ½ inch. One distance (e.g., distance 777, distance 778, distance 779) can be the same as and/or different than the other distances.

As stated above, the object 760 of FIG. 7 also includes a switch 845 that is coupled to the three antennae 875. The object 760 of FIG. 7 can also include, although not shown in FIG. 7, a controller coupled to the switch 845, where the controller can operate the switch 845 and generate the RF signals sent by the communication device 790 of the object 760. The communication device 790 can be substantially the same as the communication device 190 discussed above with respect to FIG. 1.

Figure 8:
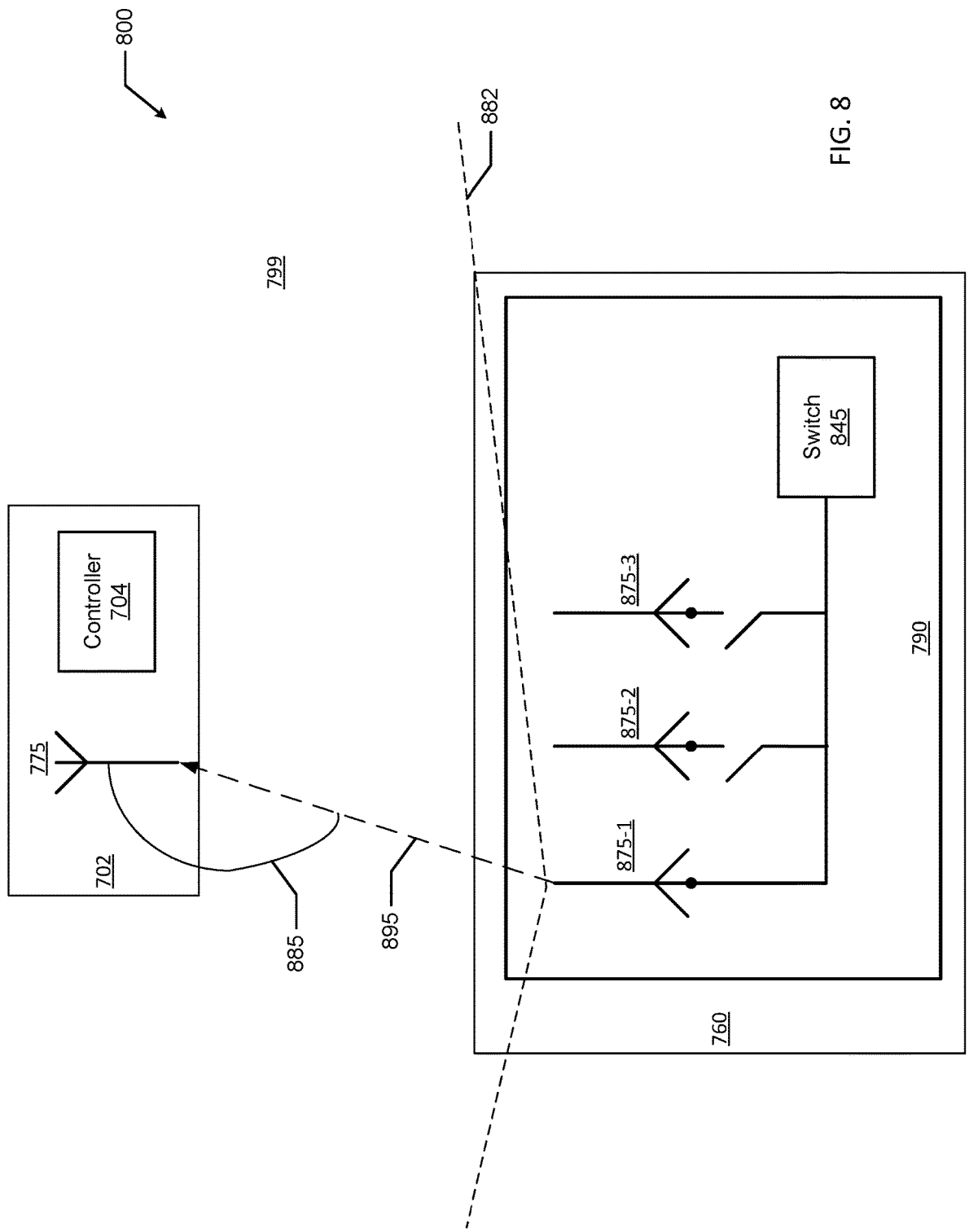
FIGS. 8-10 show the system of FIG. 7 where the object is located using an AoD method in accordance with certain example embodiments.
Figure 9:
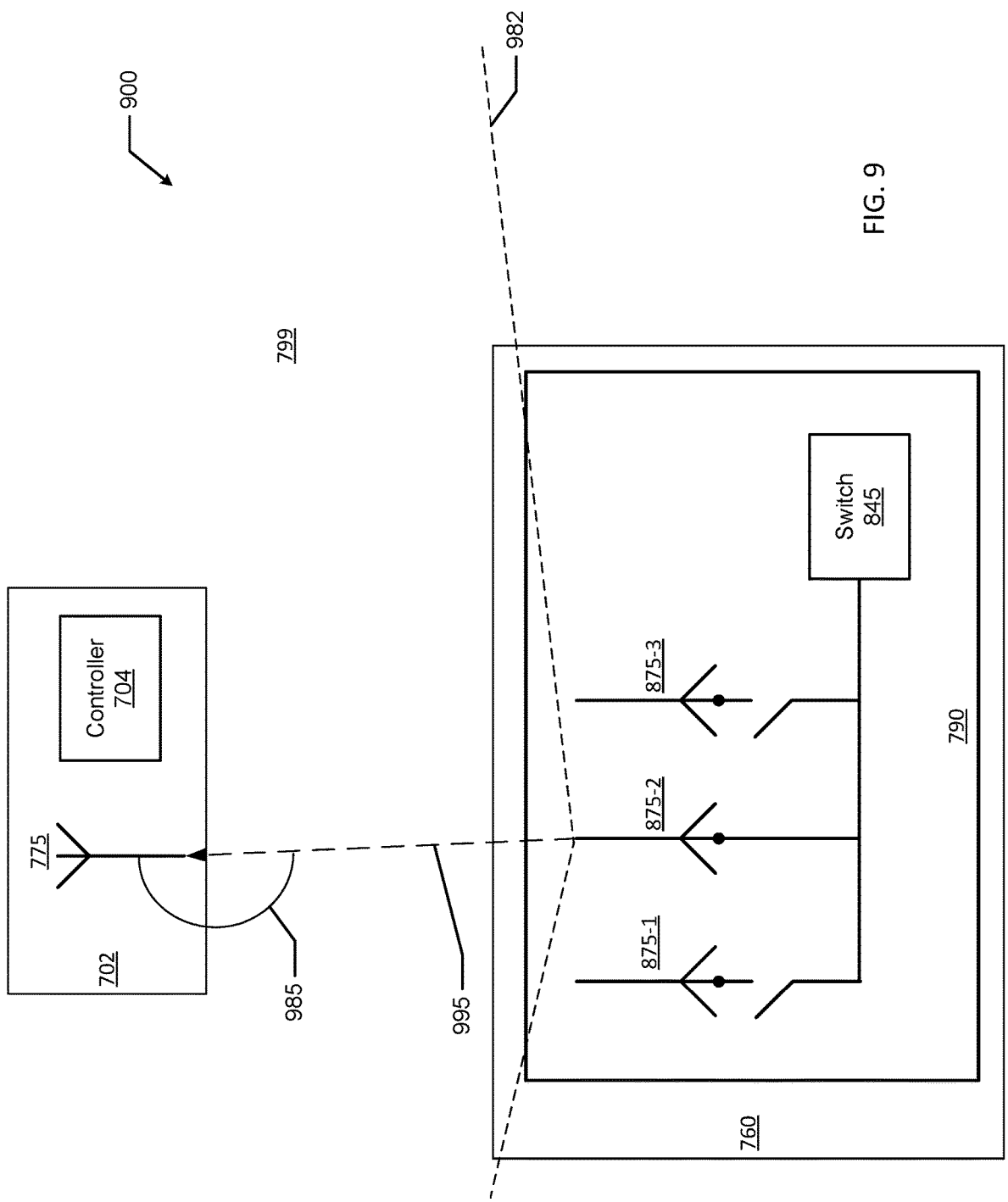
Figure 10:
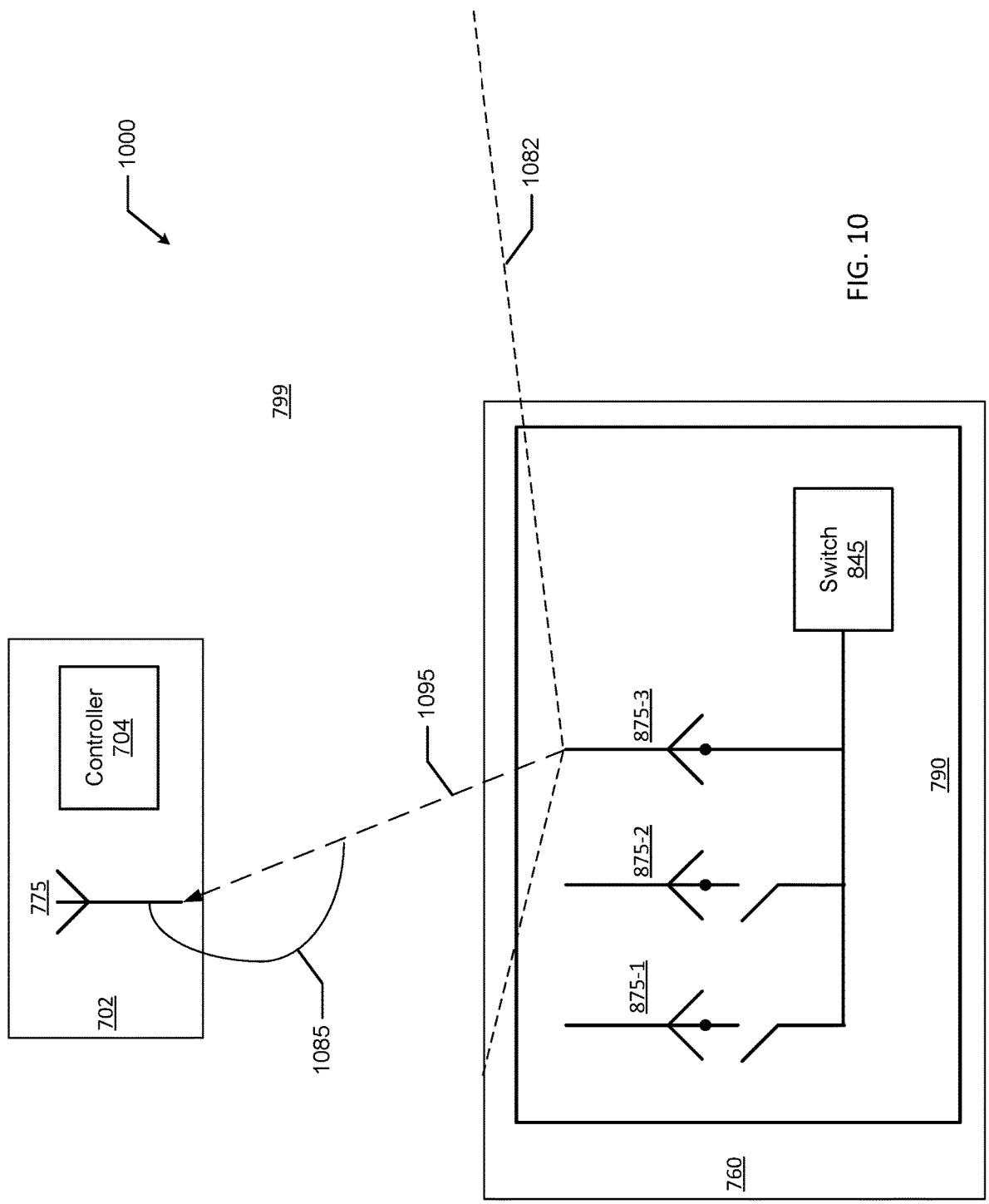

FIGS. 8-10 show the system of FIG. 7 when RF signals are sent by the object 760 and the location of the object 760 is determined using an AoD method in accordance with certain example embodiments. FIG. 8 shows the system 800 of FIG. 7 where the communication device 790 of the object 760 begins to broadcast one or more RF signals (e.g., RF signal 895) in accordance with certain example embodiments. Referring to FIGS. 1-10, antenna 875-1, antenna 875-2, and antenna 875-3 of the object 760 send, using the rest of the communication device 790, one or more RF signals. The communication device 790 of the object 760 has a broadcast range 882, and the antenna 775 of the light fixture 702 falls within the broadcast range 882.

In FIG. 8, the switch 845 in this case is closed for antenna 875-1 and open for antenna 875-2 and antenna 875-3. As a result, only antenna 875-1 sends the RF signal 895, which is received by antenna 775 of the light fixture 702 at the point in time captured by FIG. 8. When the controller 704 of the light fixture 702 receives the RF signal 895 through the antenna 775, the controller 704 can use one or more algorithms and/or protocols 132 to determine the angle 885 (a type of parameter) at which the RF signal 895 arrives (AoD) at antenna 775 from antenna 875-1 of the object 760.

At some subsequent point in time (e.g., 2 ms later, 50 ms later) relative to the time captured in FIG. 8, the switch 845 of the object 760 operates, resulting in the configuration of the system 900 shown in FIG. 9. In FIG. 9, the switch 845 in this case is closed for antenna 875-2 and open for antenna 875-1 and antenna 875-3. As a result, only antenna 875-2 sends the RF signal 995, which is received by antenna 775 of the light fixture 702 at the point in time captured by FIG. 9. (It should be noted that RF signal 995 can be the same as RF signal 895, just broadcast at different times. Alternatively, RF signal 995 and RF signal 895 can be different from each other, providing different information indicating the particular antenna 875 from which the RF signal is sent.) When the controller 704 of the light fixture 702 receives the RF signal 995 through the antenna 775, the controller 704 can use one or more algorithms and/or protocols 132 to determine the angle 985 (a type of parameter) at which the RF signal 995 arrives (AoD) at antenna 775 from antenna 875-2 of the object 760.

At some other subsequent point in time (e.g., 2 ms later, 50 ms later) relative to the time captured in FIG. 9, the switch 845 of the object 760 operates, resulting in the configuration of the system 1000 shown in FIG. 10. In FIG. 10, the switch 845 in this case is closed for antenna 875-3 and open for antenna 875-1 and antenna 875-2. As a result, only antenna 875-3 sends the RF signal 1095, which is received by antenna 775 of the light fixture 702 at the point in time captured by FIG. 10. (As discussed above, RF signal 1095 can be the same as, or different than, RF signal 895 and/or RF signal 995.) When the controller 704 of the light fixture 702 receives the RF signal 1095 through the antenna 775, the controller 704 can use one or more algorithms and/or protocols 132 to determine the angle 1085 (a type of parameter) at which the RF signal 1095 arrives (AoD) at antenna 775 from antenna 875-3 of the object 760.

Once the controller 704 has determined the angle 885 and the angle 985, the controller 704 can determine the location of the object 760 in two dimensions within the volume of space 799 using the AoD method according to example embodiments. Once the controller 704 has determined the angle 885, the angle 985, and the angle 1085 (or even additional angles if the object 760 has more than three antennae 875), the controller 704 can determine the location of the object 760 in three dimensions within the volume of space 799 using the AoD method according to example embodiments.

In one or more example embodiments, multiple electrical devices (e.g., light fixtures) use transceivers (rather than merely transmitters) to send out RF signals, the response to which from the object are used to determine the multi-dimensional location of the object in a volume of space. If two electrical devices are used, the location of the object can be defined in two dimensions. If three or more electrical devices are used, the location of the object can be defined in three dimensions. Example embodiments can provide real-time location of an object in volume of space. Using example embodiments described herein can improve communication, safety, maintenance, costs, and operating efficiency.

Accordingly, many modifications and other embodiments set forth herein will come to mind to one skilled in the art to which multi-dimensional location of an object using multiple light fixtures pertain having the benefit of the teachings presented in the foregoing descriptions and the associated drawings. Therefore, it is to be understood that multi-dimensional location of an object using multiple light fixtures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for locating an object in a volume of space, the system comprising:
   an electrical device comprising:
      a plurality of antennae;
      a switch coupled to each of the plurality of antennae; and
      a controller communicably coupled to the switch, wherein the controller:
         determines, at a first time, a first phase of a first location signal received by a first antenna of the plurality of antennae, wherein the first phase of the first location signal is associated with a location of the object, and wherein the first location signal is unassociated with providing access to a communication network;
         operates the switch from a first position to a second position, wherein the first position enables the first antenna and disables a second antenna of the plurality of antennae, and wherein the second position enables the second antenna and disables the first antenna of the plurality of antennae;
         determines, at a second time, a second phase of a second location signal received by the second antenna of the plurality of antennae, wherein the second phase of the second location signal is associated with the location of the object, and wherein the second location signal is unassociated with providing access to the communication network; and
   a network manager communicably coupled to the controller of the electrical device, wherein the network manager:
      receives a first communication signal from the controller, wherein the first communication signal comprises an electrical device location of the electrical device in the volume of space, the first phase of the first location signal, and the second phase of the second location signal; and
      determines, using the electrical device location, the first phase of the first location signal, and the second phase of the second location signal, a multi-dimensional location of the object in the volume of space.

2. The system of claim 1, wherein the controller further:
   operates the switch from the second position to a third position, wherein the third position enables a third antenna of the plurality of antennae;
   measures a third phase of a third location signal at the third antenna of the plurality of antennae, wherein the third phase of the third location signal is associated with the location of the object; and
   sends the third phase of the third location signal to the network manager, wherein the network manager determines, using the electrical device location of the electrical device, the first phase, the second phase, and the third phase, a three-dimensional location of the object in the volume of space.

3. The system of claim 1, wherein the first location signal and the second location signal are radio frequency signals.

4. The system of claim 1, wherein the first antenna and the second antenna are separated by a distance that is at least ½ of a wavelength of the first location signal.

5. The system of claim 1, wherein the object initiates the first location signal.

6. The system of claim 1, wherein the controller operates the switch from the first position to the second position upon detecting that the first antenna has received the first location signal broadcast by the object.

7. The system of claim 1, wherein the first location signal broadcast by the object includes an identification of the object.

8. The system of claim 1, wherein the first phase comprises a first angle, and wherein the second phase comprises a second angle.

9. The system of claim 8, wherein the multi-dimensional location of the object is determined using an angle of arrival method based on the first angle and the second angle.

10. The system of claim 1, wherein at least one antenna of the plurality of antennae is integrated with an outer surface of the electrical device.

11. The system of claim 1, wherein at least one antenna of the plurality of antennae protrudes from an outer surface of the electrical device.

12. The system of claim 1, wherein the electrical device comprises a light fixture.

13. The system of claim 1, wherein the objects is substantially stationary between the first time and the second time.

14. A system, comprising:
an electrical device comprising an electrical device antenna and a controller, wherein the electrical device is located in a volume of space;
an object located in the volume of space, wherein the object comprises a plurality of object antennae and a switch coupled to each of the plurality of object antennae, wherein the object:
operates the switch to activate a first object antenna and disable a first remainder of the plurality of object antennae;
broadcasts a first location signal at a first time through the first object antenna, wherein the first location signal is unassociated with providing access to a communication network;
operates the switch to activate a second object antenna and disable a second remainder of the plurality of object antennae; and
broadcasts a second location signal at a second time through the second object antenna, wherein the second location signal is unassociated with providing access to the communication network,
wherein the electrical device, using the antenna receives the first location signal and the second location signal, and
wherein the controller of the electrical device:
determines a first phase of the first location signal and a second phase of the second location signal;
generates a first communication signal comprising an electrical device location of the electrical device in the volume of space, the first phase of the first communication signal, and the second phase of the second location signal; and
sends the first communication signal; and
a network manager communicably coupled to the controller of the electrical device, wherein the network manager:
receives the first communication signal; and
determines, using the electrical device location of the electrical device in the volume of space, the first phase of the first communication signal, and the second phase of the second location signal, a multi-dimensional location of the object in the volume of space.

15. The system of claim 14, wherein the object further:
operates the switch to activate a third object antenna of the plurality of object antennae; and
broadcasts a third location signal at a third time through the third object antenna,
wherein the electrical device antenna further receives the third signal having a third phase, and
wherein the controller determines, using the electrical device location of the electrical device, the first phase of the first signal, the second phase of the second signal, and the third phase of the third signal, a three-dimensional location of the object in the volume of space.

16. The system of claim 14, wherein the first phase comprises a first angle at which the first antenna receives the first signal, and wherein the second phase comprises a second angle at which the second antenna receives the second signal.

17. The system of claim 16, wherein the multi-dimensional location of the object is determined using an angle of departure method based on the first angle and the second angle.

18. The system of claim 14, wherein the object further comprises an object controller for operating the switch.

19. The system of claim 14, wherein the object and the electrical device are substantially stationary in the volume of space between the first time and the second time.

20. An electrical device comprising:
a housing;
a first antenna of a plurality of antennae disposed on the housing at a first housing location;
a second antenna of the plurality of antennae disposed on the housing at a second housing location;
a switch coupled to each of the plurality of antennae; and
a controller communicably coupled to the switch, wherein the controller is configured to:
determine, at a first time, a first phase of a first location signal received at the first antenna, wherein the first phase of the first location signal is associated with a location of the object, and wherein the first location signal is unassociated with providing access to a communication network;
operate the switch from a first position to a second position, wherein the first position enables the first antenna and disables the second antenna, and wherein the second position enables the second antenna and disables the first antenna;
determine, at a second time, a second phase of a second location signal received by the second antenna, wherein the second phase of the second location signal is associated with the location of the object, wherein the second location signal is unassociated with providing access to the communication network;
generate a communication signal comprising an electrical device location of the electrical device in a volume of space, the first phase of the first communication signal, and the second phase of the second location signal; and
send the communication signal to a network manager, wherein the network manager is configured to:
receive the communication signal; and
determine, using the electrical device location of the electrical device, the first phase of the first location signal, and the second phase of the second location signal, a multi-dimensional location of the object in the volume of space.

* * * * *